Figure 1:
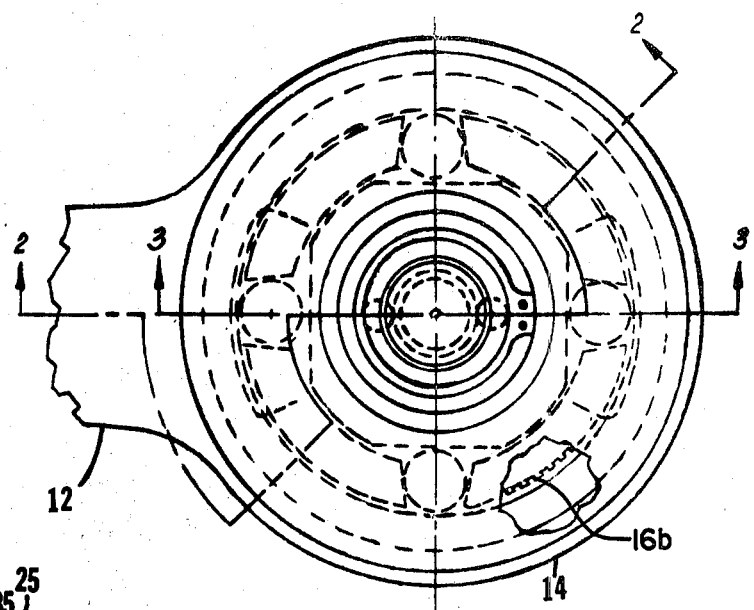

United States Patent [19]

Stephens

[11] 4,297,924
[45] Nov. 3, 1981

[54] RATCHET WRENCH

[75] Inventor: Leonard W. Stephens, Fairview, Pa.

[73] Assignee: Perry M. Lane, Washington, Pa.

[21] Appl. No.: 149,462

[22] Filed: May 13, 1980

[51] Int. Cl.³ ............................................. F16D 41/08
[52] U.S. Cl. ..................................... 81/59.1; 81/63.1; 81/177 G; 192/44
[58] Field of Search ................... 81/59.1, 63.1, 177 G; 192/44

[56] References Cited

U.S. PATENT DOCUMENTS

| Re. 28,561 | 9/1975 | Stephens | 192/44 |
| 2,707,540 | 5/1955 | Morris | 192/44 X |
| 3,019,872 | 2/1962 | Morris et al. | 192/44 |
| 3,532,013 | 10/1970 | Haznar | 81/177 G |

Primary Examiner—Allan D. Herrmann
Attorney, Agent, or Firm—Ralph Hammar

[57] ABSTRACT

A ratchet wrench with an improved reversing and socket releasing mechanism.

21 Claims, 9 Drawing Figures

RATCHET WRENCH

This invention improves the reversing mechanism of U.S. Pat. No. Re 28,561 and adds a mechanism for quickly releasing a socket.

Figure 2:
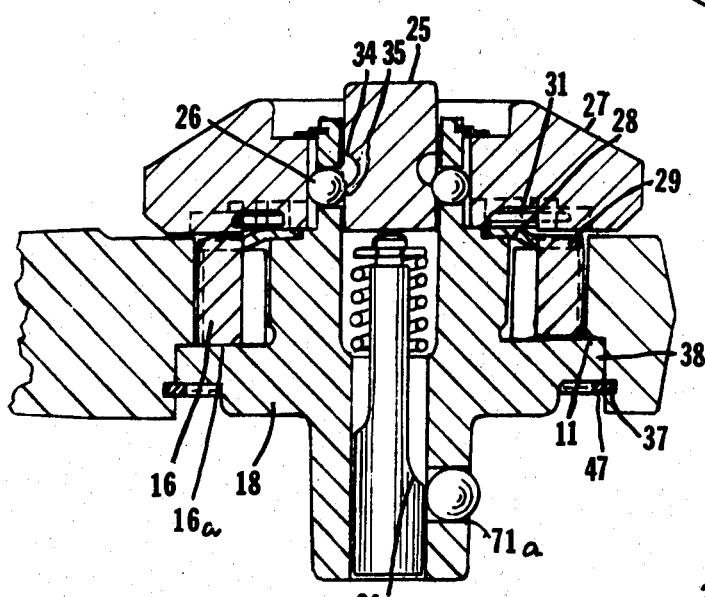
Figure 3:
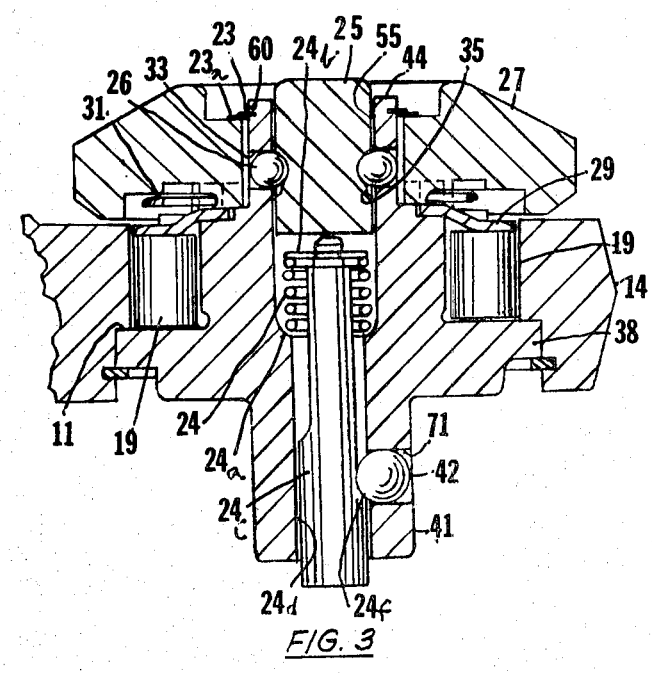
Figure 4:
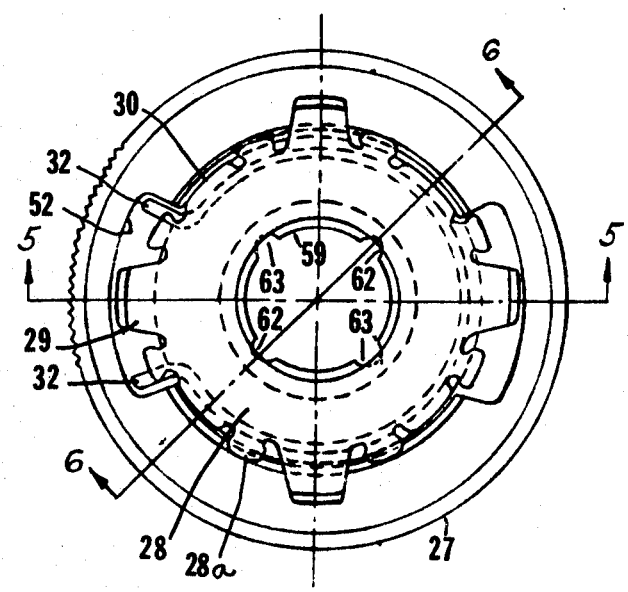
Figure 5:
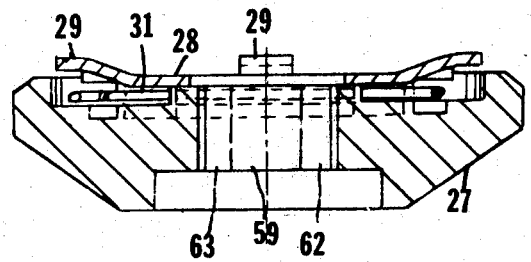
Figure 6:
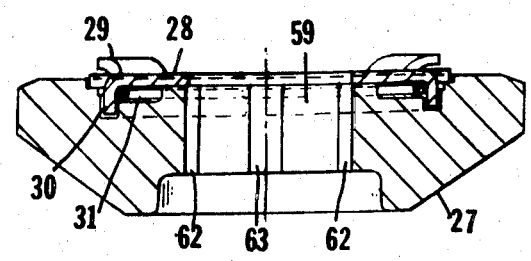
Figure 7:
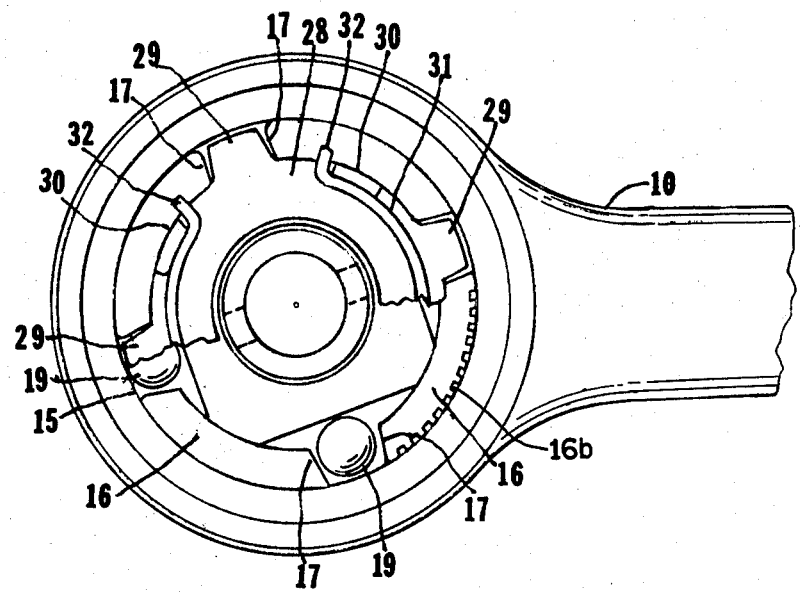
Figure 8:
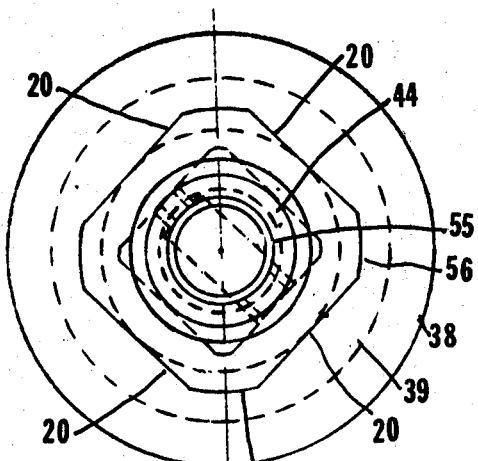
Figure 9:
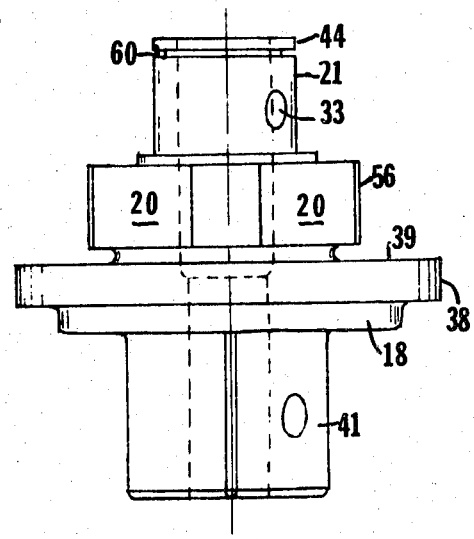

In the drawings,

FIG. 1 is a top view of a preferred embodiment of the invention, showing the clutch used in a wrench, the clutch being disengaged, FIG. 2 is a cross sectional view taken on line 2—2 of FIG. 1, but with the cap of the wrench turned to engage the clutch, FIG. 3 is a cross sectional view taken on line 3—3 of FIG. 1, FIG. 4 is a bottom view of the cap at the level indicated by line 4—4 in FIG. 3 showing the drive between the cap and the star wheel, FIGS. 5 and 6 are sections on lines 5—5 and 6—6 of FIG. 4, FIG. 7 is a top view of the wrench with the cap, locking balls and button removed, and with the star wheel and clutch actuating spring partly broken away, showing the clutch shoes and rollers at the level indicated by line 7—7 of FIG. 3, FIG. 8 is a top view of the shank shown in FIG. 9, and FIG. 9 is a side view of the shank as shown in FIG. 8.

The clutch according to the invention is shown in a preferred embodiment in use in a wrench for use by mechanics. The wrench is indicated generally at 10, having a drive means by way of a handle 12, and major components include the shank 18, cap 27, reversing star wheel 28, shoes 16, cam roller members 19, and clutch actuating spring 31. The wrench body 14 has an internal cylindrical surface 15 which can be frictionally engaged by the outer cylindrical surfaces of shoes 16. The body 14 has an internal peripheral groove 37, which receives a spring washer 47. The spring washer 47 engages the rim 38 on the shank and holds the shank 18 in place in the body. The shank rests against the shoulder 11 in the body and can rotate between the shoulder 11 and the washer 47. The corners 56 of the shank, between the cam surfaces 20, are rounded on a radius slightly less than the inside diameter of the shoes 16, so that the shank can rotate relative to the arcuate shoes.

The shank 18 has the socket wrench receiving male drive member 41, which may be inserted into a suitable socket wrench of a type familiar to those skilled in the art and a detent ball 42 in hole 71 in the male member.

The shank 18 has a round stem 21 that is in the form of a cylinder integral with the cam portion 56 of the shank 18. The cam portion 56 is generally square and has the flat cam surfaces 20 on each of its four sides, and these cam surfaces 20 can engage the rollers 19 which in turn can engage the ends 17 of shoes 16 and urge the shoes outward into engagement with surface 15.

The wrench is assembled by placing the shank 18 into the body 14 with the rim 38 resting against the shoulder 11 as shown in FIGS. 2 and 3. The snap ring washer 47 is then snapped into the groove 37 so that the shank can freely rotate between the shoulder 11 and the washer. The shoes 16 are then placed inside the cylindrical surface 15 resting on surface 39 of the shank, and the cam roller members 19 are placed between the beveled ends 17 of the shoes. The star wheel 28 is then laid over top of the shoes 16 and the cam roller members 19 in the position shown in the upper part of FIG. 7 with the points 29 of the star wheel disposed in driving relation between the ends 17 of the shoes as shown in FIGS. 2 and 7 and overlying the cam roller members 19 as shown in FIG. 3. It will be noted that the shoes 16 are symmetrical and have flat upper and lower surface 16a either of which may be upper or lower. The star wheel has tabs 28a which coverlie the upper ends 16a of the shoes. The star wheel has upwardly extending lugs 30, within the circular locus of which the spring 31 is disposed. It will be noted that spring 31 is in the form of a ring or annulus with spaced apart, outwardly extending ends 32. The outwardly extending ends 32 turn outwardly between a pair of the lugs 30 and are received in one of the diametrically opposed recesses 52 (FIG. 4) in the underside of the cap 27. The ring-shaped spring 31 caged within lugs 30 is also housed in an annular recess at the underside of cap 27, above star wheel 28 as viewed in FIGS. 3 and 4. A spring washer 23 is snapped into a groove 60 in shank 18. This washer 23 overlies a washer 23a in the well bottom 61 of cap 27 and holds the cap 27 in place.

The ends of the opening 52 limit the movement of the ends 32 of the annular spring 31 and force the spring to rotate together with the cap when the cap is rotated. When the cap is rotated, one end of the opening 52 engages and moves a first end 32 of the spring 31, and the other end 32 of the spring is pressed against an upturned lug 30 of the star wheel 28. When the cap is rotated in the opposite direction, the other end of the opening 52 engages said other end 32 of the spring and the first end of the spring is pressed against a star wheel lug 30. Thus, the star wheel 28 is forced to rotate with the cap by the ends 32 of the spring which engage the lugs 30.

The button 25 is received in a central bore 55 in stem 21 at the end 44 of the shank 18.

A spring 24 between a shoulder 24a in a central bore 55 in stem 21 exerts an upward pressure on a washer 24b at the upper end of pin 24c slidable in a reduced diameter extension 24d of bore 55. The upward pressure of spring 24 when compressed as shown in FIG. 3 is transferred from the upper end of pin 24c to the lower end of the button 25.

The stem 21 has a radial hole 33 in it, in which locking balls 26 are received. These locking balls 26 move into the large peripheral recess 34 in the button 25 when the button is in the depressed position, that is, pushed downward, and when the button 25 is held upward by spring 24, the locking balls 26 are received in the shallow peripheral recess 35 in the button 25.

A central bore 59 in the cap 27, coaxial with the shank 18, receives the shank stem 21, and the surface of bore 59 has a first pair of diametrically opposed grooves or recesses 62 and a second pair of diametrically opposed grooves or recesses 63. The locking balls 26 may move into either of the circumferentially spaced pairs of grooves 62 or 63, depending on the position to which the cap 27 is rotated relative to the shank. Thus, when the cap is rotated with the button 25 in the depressed position and the balls 26 in the deep peripheral recess 34 of the button, the stem recesses 33 containing the balls 26 can be aligned with one of the pairs of recesses or grooves 62 or 63, the balls may move outward and allow the button 25 to jump up urged by the spring 24 so that the balls rest in the shallow groove 35, as shown in FIG. 2. Thus the cap 27 will be fixed to the shank 18.

In the operation, assume that the button 25 has been depressed as shown in FIG. 3, and the positioning balls 26 are in the large button recess 34 so that the cap is not fixed to the shank 18, and the cap is turned to a position where the balls 26 are midway between grooves 62, 63 in the cap. The button cannot pop up because the balls 26 cannot move radially out of the large button recess 34. The ball 42 is received in groove 24e in the lower end of pin 24c so the socket retaining ball 42 is retracted in opening 71 and the lower end 24f of the pin projects below the male drive member 41. The ring like spring 31 which is housed in the star wheel 28 has its ends 32 received in one of the recesses 52 in the underside of the cap as shown in FIG. 4. The spring which is compelled to rotate with the cap by engagement of the spring ends 32 with the ends of the recess 52 is in a neutral position as shown in FIG. 7, as is the star wheel 28 whose points 29 are between successive clutch shoes 16. The rollers 19 are also in neutral positions between the clutch shoes.

Now suppose that the cap is rotated counterclockwise as viewed from the top while the shank 18 is held manually or otherwise against rotation. As viewed in FIG. 7, the right hand end 32 of spring 31 is pushed counterclockwise by the adjacent end of opening 52 in the cap causing the left hand end 32 of the spring to push counterclockwise the adjacent upstanding lug 30 of star wheel 28. Star wheel 28 is thus resiliently pressed to rotate counterclockwise, and its points 29 engage ends of the shoes 16, shifting the shoes counterclockwise until the opposite bevelled ends 17 of the shoes press the rollers 19 against the cam surfaces 20 of the shank 18. Spring 31 is compressed until the locking balls 26 come opposite grooves 63, when the button spring 24 presses the button up and forces the balls 26 into the cap recesses 63 aligned with the stem recesses 33, fixing the cap to the shank in a first setting. If the wrench handle 12 and body 14 are now turned counterclockwise, the shoes 16 are pressed by the rollers against the inner annular surface 15 of the body 14, and the rollers engaging the shank force the shank to rotate with the body, without any play. However, if the wrench handle and body are turned clockwise, the shoes are not jammed against the inner annular surface 15 of the wrench body. The shoes can slide inside the wrench body as the handle is rotated in this clockwise direction, and thus the clutch operates only one way.

Conversely, when the cap is rotated clockwise from the neutral position so that the balls 26 move into the grooves 62, the cap will be fixed to the shank in a second setting, the left hand end 32 of the spring will engage the other end of the opening 52 of the cap, the right hand end of the spring will push the star wheel clockwise, and the points 29 of the star wheel move the shoes 16 clockwise relative to the position illustrated in FIG. 7, with rollers 19 jammed between the beveled shoe ends 17 and the shank cam surfaces 20, so that with clockwise movement of the wrench body, the shank must turn, whereas the shank is not forced to turn when the handle is rotated in the other, i.e., counterclockwise, direction relative to the shank.

The star wheel 28 constitutes a single rigid member for positioning all the clutch shoes 16 by engagement therewith when actuated by the cap 27 and the annular spring 31. Reversing of the star wheel reverses the direction in which the shank 18 can be driven. The cap 27 constitutes a rigid actuating member which, by engagement with the actuating spring 31, actuates the reversing member 28 and thus the clutch.

In the driving position shown in FIG. 2, the ball 42 is urged outward by engagement with cam surface 24f at the lower end of groove 24e. The ball 42 is staked in the opening 71 before hardening providing a stop 71a at the outer end of opening 71 which limits the outward movement of the ball shown in FIG. 2.

The wrench is adapted to automatic assembly. The pin 24c, ball 42 and spring 24 are easily assembled into the shank 18 and held in place by snap ring 24b. The shank is easily assembled into the body 14 and held in place by snap ring 47. The clutch shoes 16, rollers 19, star wheel 29, button 25, locking balls 31 and cap 27 are easily assembled around and on the shank and held in place by snap ring 23.

The wrench eliminates the backlash or reverse movement required by ratchet teeth. The springs 24b and 31 provide an automatic takeup for wear. The button 25 provides a quick release of the socket in addition to controlling the drive. If the quick release feature is not wanted, the bore 55 is stopped at shoulder 24a so the lower end of the shank including the drive member 41 is solid. The spring 24 acts directly on the button 25. This form of the wrench is stronger.

The shoes are made from long strips of steel drawn through a die having a shape corresponding to the cross section of the shoes. The longitudinal side edges of the strip correspond to the beveled ends of the shoes. The top and bottom surfaces of the strip corresponds to the outer and inner cylindrical surfaces of the shoes. Preferably the top surface of the strip comprises a plurality of shallow longitudinal grooves and ribs parallel to the edge of the strip so as to improve the gripping action of the outer cylindrical surfaces of the shoes. The knurled surface 16b produced by the grooves and ribs is shown in FIGS. 1 and 7. By way of example and not of limitation the ribs could be spaced twenty to the inch with a height of 0.008." The only machining operation required is to cut off the shoes from the strip. The saw cuts provide the flat ends 16a of the shoes. After sawing, each shoe passes between grinding wheels which finish the cut surfaces and size the height of the shoes. The shoes are much easier to make than the corresponding shoes in U.S. Pat. No. Re. 28,561 and are superior in performance due to the elimination of feathering on machined surfaces. Feathering consists of fine steel fibers invisible to the naked eye which cannot be removed by sand blasting and tumbling but which break off in use and have a grinding action on the working parts which leads to wrench failure.

I claim:

1. A clutch comprising a shank,
   a rotatable body member having an inner annular surface around the shank,
   arcuate shoes located between the shank and said inner surface for frictionally engaging said inner surface,
   rollers located between the arcuate shoes and engageable with the ends of the shoes to press them against said inner surface,
   a rigid positioning member movable in one direction to engage the shoes and hold first ends of the shoes against the rollers and the rollers against the shank whereby when the body member is rotated in said one direction the shoes are held by the rollers against said inner surface and the rollers engaging the shank force the shank to rotate in said one direction but when the body member is rotated in the opposite direction the shoes can slide on said inner surface, the rigid positioning member being movable in said opposite direction to engage the shoes and hold second ends of the shoes against the rollers and the rollers against the shank whereby when the body member is rotated in said opposite direction the shoes are held by the rollers against said inner surface and the rollers engaging the shank force the shank to rotate in said opposite direction but when the body member is rotated in said one direction the shoes can slide on said inner surface, and actuating means having spring means engageable with the rigid positioning member to press it to its shoe engaging positions, said shoes having symmetrical upper and lower surfaces either of which may be top or bottom and further having symmetrical ends either of which may be said first end or said second end.

2. The clutch recited in claim 1 wherein the actuating means includes a rigid actuating member movable to force the spring means to move the rigid positioning member.

3. The clutch recited in claim 2 wherein the spring means comprises an annular spring having spaced apart first and second ends, the rigid actuating member being movable in said one direction to engage said first end and thus press said second end against the rigid positioning member to move the latter in said one direction, the rigid actuating member being movable in said opposite direction to engage said second end and thus press said first end against the rigid positioning member to move the latter in said opposite direction.

4. The clutch recited in claim 3 wherein the positioning member has a means for caging the spring.

5. The clutch recited in claim 3 wherein the rigid positioning member has lugs within which the spring is disposed, the spring ends being turned outwardly between such lugs for engagement therewith in response to movement of the rigid actuating member.

6. The clutch recited in claim 5 wherein the rigid actuating member has an opening in which the outwardly turned spring ends are received, ends of the opening being engageable with the spring ends, when the rigid actuating member is moved, to force the spring to move the rigid positioning member.

7. The clutch recited in claim 2 including means for fixing the rigid actuating member relative to the shank in a first setting with the rigid positioning member moved in said one direction, and in a second setting with the rigid positioning member moved in said opposite direction.

8. The clutch recited in claim 7 wherein the rigid actuating member comprises a cap coaxial with the shank, and the means for fixing the cap relative to the shank comprise alignable recesses in the cap and shank, a ball located in one of said recesses and movable partly out of said one recess and into another recess aligned therewith to prevent relative movement of the cap and shank, and a spring pressed button for so moving the ball when recesses are aligned.

9. The clutch recited in claim 8 wherein the button is located within the cap and can be depressed to allow the ball to move out of said other recess and permit relative movement of the cap and shank.

10. The clutch recited in claim 9 wherein the button has a recess into which the ball can move from said other recess.

11. A clutch comprising a body member having an inner annular surface,
drive means for said body member,
shoes having outer surfaces for frictionally engaging said annular surface,
rollers engageable with the ends of said shoes,
a shank having cam means engageable with said rollers,
reversing means comprising a rigid positioning member movable in one direction to engage the shoes and press first ends of the shoes against the rollers and the rollers against the cam means of the shank so that when said drive means rotates the body member in said one direction the shoes are held by the rollers in engagement with the body member, forcing the shoes and shank to rotate, whereas when said drive means rotates the body member in the opposite direction the shoes are not so held,
said rigid positioning member being movable in said opposite direction to engage the shoes and press second ends of the shoes against the rollers and the rollers against the cam means of the shank so that when said drive means rotates the body member in said opposite direction the shoes are held by the rollers in engagement with the body member forcing the shoes and shank to rotate, whereas when said drive means rotates the body member in said one direction the shoes are not so held, said shoes having symmetrical upper and lower surfaces either of which may be top or bottom and further having symmetrical ends either of which may be said first and or said second end, and actuating means having spring means engageable with the rigid positioning member to move it to its shoe engaging positions.

12. The clutch recited in claim 11 wherein the rigid positioning member comprises a wheel having portions that overlie said rollers and that are engageable with the shoes.

13. The clutch recited in claim 12 wherein the actuating means includes a cap, the spring means comprises a ring-shaped spring having a first and a second end, the cap being engageable with said first end to press said second end against the right positioning member and move the latter in said one direction, the cap being engageable with said second end to press said first end against the rigid positioning member and move the latter in said opposite direction, and including means for fixing the cap relative to the shank in a first setting with the rigid positioning member moved in said one direction, and in a second setting with the rigid positioning member moved in said opposite direction.

14. The clutch recited in claim 13 wherein said means for fixing said cap comprises a cylindrical stem on said shank, a central bore in said cylindrical stem, a radial hole in said cylindrical stem, a positioning button in said central bore, a shallow recess and a deep recess in said button, a string engaging said button, urging said button outwardly, said cap having a central bore receiving said cylindrical stem, two circumferentially spaced grooves in said cap in the surface defining said central bore of the cap, a positioning ball in said radial hole, said ball being movable out of said grooves in said cap and into said deep recess in said button when said button is in a first position, said ball being movable into one or the other of said grooves in said cap and into said shallow recess in said button when said button is in a second position, said cap being engaged with first end of said ring-shaped spring when said ball is in one of said grooves of the cap and engaged with said second end of said ring-shaped spring when said ball is in the other of said grooves of the cap.

15. The clutch recited in claim 13 wherein said means for fixing said cap comprises a cylindrical stem on said shank, a central bore in said cylindrical stem, a radial hole in said cylindrical stem, a positioning button in said central bore, a shallow recess and a deep recess in said button, a spring engaging said button urging said button outwardly, said cap having a central bore receiving said cylindrical stem, four circumferentially spaced grooves in said cap in the surface defining said central bore of the cap, two balls in said radial hole, said balls being movable out of said grooves in said cap and into said deep recess in said button when said button is in a first position, said balls being movable into two of the said grooves in said cap and into said shallow recess in said button when said button is in a second position, thus fixing said cap relative to said cylindrical stem of said shank, said cap being engaged with said first end of said ring-shaped spring when said balls are in two of said grooves of the cap and engaged with said second end of said ring-shaped spring when said balls are in the other two of said grooves of the cap.

16. The clutch of claim 12 in which the wheel has other portions that overlie the top surfaces of the shoes.

17. The clutch of claim 1 in which said shoes have planar upper and lower surfaces.

18. The clutch of claim 8 in which the shank has a cylindrical stem with a central bore receiving the button and a socket drive element at the lower end of the shank with a transverse ball receiving opening intersecting said bore, a pin slidable in said bore and having its upper end spring biased against the button, said pin having its lower end intersecting said transverse ball receiving opening and receiving the locking ball when said button is depressed and having a cam surface camming the locking ball outward into locking engagement with the socket when the button is raised.

19. The clutch of claim 1 in which the outer surface of said shoes is knurled.

20. The clutch of claim 19 in which the knurling comprises spaced grooves perpendicular to upper and lower surfaces of the shoes.

21. The clutch of claim 20 in which the shoes are cut off from a long strip of steel drawn through a die which forms the edges of the strip to the shape of the ends of the shoes and forms the upper and lower surfaces of the strip to the arcuate shape of the shoes.

* * * * *